US007007514B2

(12) United States Patent
Sakai et al.

(10) Patent No.: US 7,007,514 B2
(45) Date of Patent: Mar. 7, 2006

(54) VACUUM DEGASSING APPARATUS FOR MOLTEN GLASS

(75) Inventors: Mitsuyoshi Sakai, Chiba (JP); Michito Sasaki, Kanagawa (JP); Hajime Itoh, Kanagawa (JP); Rei Kitamura, Kanagawa (JP); Atsushi Tanigaki, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 404 days.

(21) Appl. No.: 10/256,014

(22) Filed: Sep. 27, 2002

(65) Prior Publication Data

US 2003/0066315 A1 Apr. 10, 2003

(30) Foreign Application Priority Data

Sep. 28, 2001 (JP) ............................ 2001-299213
Oct. 13, 2001 (JP) ............................ 2001-334106

(51) Int. Cl.
*C03B 5/225* (2006.01)

(52) U.S. Cl. ....................... 65/157; 65/134.2; 65/134.9

(58) Field of Classification Search ............... 65/134.2, 65/134.9, 157, 346, 347; 75/510–512; 266/210
See application file for complete search history.

(56) References Cited

U.S. PATENT DOCUMENTS

| | | | | |
|---|---|---|---|---|
| 3,042,510 | A * | 7/1962 | Armbruster et al. | 75/511 |
| 6,119,484 | A | 9/2000 | Takei et al. | |
| 6,334,336 | B1 | 1/2002 | Takei et al. | |
| 6,401,492 | B1 | 6/2002 | Nattermann | |
| 6,405,564 | B1 | 6/2002 | Takei et al. | |

FOREIGN PATENT DOCUMENTS

| | | |
|---|---|---|
| DE | 198 22 437 | 7/1999 |
| DE | 200 22 727 | 4/2002 |
| DE | 100 55 967 | 5/2002 |
| DE | 101 05 004 | 8/2002 |
| EP | 1 078 891 | 2/2001 |
| JP | 11-130444 | 5/1999 |
| JP | 2000-7345 | 1/2000 |

OTHER PUBLICATIONS

JP2000 007345, English Machine Translation, performed on Jan. 21, 2005.*
Perry et al., Perry's Chemical Engineers' Handbook, Copyright 1997, p. 3-10 and 3-11.*
English Translation of German patent DE 100 55 967, performed Feb. 2005.*

* cited by examiner

*Primary Examiner*—Steven P. Griffin
*Assistant Examiner*—Lisa Herring
(74) *Attorney, Agent, or Firm*—Oblon, Spivak, McClelland, Maier & Neustadt, P.C.

(57) ABSTRACT

A vacuum degassing apparatus for molten glass includes a vacuum housing which is evacuated to be depressurized therein; a vacuum degassing vessel which is provided in the vacuum housing to vacuum-degas molten glass as the molten glass flows therein; an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass. The cross sectional area of the path at the upper end portion of the uprising pipe is larger than the cross sectional area of the path at the lower end portion of the uprising pipe.

3 Claims, 9 Drawing Sheets

VACUUM DEGASSING APPARATUS FOR MOLTEN GLASS

The present invention relates to a vacuum degassing apparatus for molten glass, which removes bubbles from molten glass continuously supplied.

In order to improve the quality of formed glass products, there has been used a vacuum degassing apparatus which removes bubbles generated in molten glass before the molten glass that has been molten in a melting tank is formed by a forming apparatus, as shown in FIG. 3.

The vacuum degassing apparatus 110 shown in FIG. 3 is used in a process wherein molten glass G in a melting vessel 112 is vacuum-degassed and is continuously supplied to a subsequent treatment vessel. In the vacuum degassing apparatus 110 are provided a vacuum housing 114 which is evacuated to be depressurized therein for vacuum-degassing the molten glass, a vacuum degassing vessel 116 which is provided in the vacuum housing 114 and is depressurized together with the vacuum housing, and an uprising pipe 118 and a downfalling pipe 120 which are connected to respective end portions of the vacuum degassing vessel in a downward and vertical direction. The uprising pipe 118 has a lower end immersed in the molten glass G in an upstream pit 122 in communication with the melting vessel 112. Likewise, the downfalling pipe 120 has a lower end immersed in the molten glass G in a downstream pit 124 in communication with the subsequent treatment vessel (not shown).

The vacuum degassing vessel 116 is substantially horizontally provided in the vacuum housing 114 which is evacuated through a suction port 114*c* by a vacuum pump, not shown, to be depressurized therein. Since the inside of the vacuum degassing vessel 116 is depressurized, through suction ports 116*a* and 116*b* in communication with the inside of the vacuum housing 114, to a pressure of $\frac{1}{20}$–$\frac{1}{3}$ atm together with the inside of the vacuum housing 114, the molten glass G in the upstream pit 122 before degassing is sucked and drawn up through the uprising pipe 118, and is introduced into the vacuum degassing vessel 116. Then, the molten glass is vacuum-degassed as it flows through the vacuum degassing vessel 116, and the molten glass is drawn down by the downfalling pipe 120 to be discharged into the downstream pit 124.

The vacuum housing 114 may be a casing made of metal, such as stainless steel and heat-resisting steel. The vacuum housing is evacuated from outside by e.g. a vacuum pump (not shown) and the inside is depressurized, so that the inside of the vacuum degassing vessel 116 provided therein is depressurized and maintained under a prescribed pressure, e.g. under a pressure of $\frac{1}{20}$–$\frac{1}{3}$ atm. In the vacuum degassing vessel 116, an upper space 116*s* is formed above the molten glass G filled to a certain depth in the vacuum degassing vessel. The upper space 116*s* is a space depressurized by a vacuum pump (not shown) so that gas components from bubbles which have risen to the surface of the molten glass G and broken up, are sucked from the upper space being the depressurized space, through a suction port 114*c* by a vacuum pump (not shown). Therefore, the larger the area of the molten glass G in contact with the upper space 116*s* is, the more remarkable the vacuum degassing effect becomes.

Around the vacuum degassing vessel 116, the uprising pipe 118 and the downfalling pipe 120 in the vacuum housing 114 is provided thermal insulation material 126, such as refractory bricks, to cover these members for thermal insulation.

Further, with a conventional vacuum degassing apparatus 110 as illustrated in FIG. 3, it is conceivable to enlarge the apparatus in an attempt to increase the flow rate i.e. the throughput capacity for degassing by constituting the vacuum degassing vessel 116 by dense refractory bricks, particularly by electro-cast refractory bricks, as disclosed in JP-A-11-240725 filed by the present applicant.

However, in order to increase the flow rate of the molten glass and to perform the desired vacuum degassing treatment, it is necessary to increase the width and the total length (namely, the bottom area) of the vacuum degassing vessel 116, and the diameters of the uprising pipe 118 and the downfalling pipe 120, by taking into consideration, changes in various factors (for example, a change in the flow rate of the molten glass G to be degassed, a change in the concentration of gas components dissolved in the molten glass G due to a temperature drop of the molten glass G in the melting furnace, or a change in the pressure in the vacuum degassing vessel which is depressurized).

However, by increasing the width and the total length of the vacuum degassing vessel 116, and the diameters of paths in the uprising pipe 118 and the downfalling pipe 120, the apparatus will be large-sized, and necessary refractory bricks, etc. will inevitably increase, thus leading to a problem of an increase of the costs.

Further, when the number of bubbles contained in the molten glass G rapidly increase, there will be a problem such that non-removed bubbles will remain in the molten glass G, which will flow into the downfalling pipe, and the bubbles are likely to remain in the glass as a product. Further, due to the increase of the number of bubbles, unbroken bubbles may build up on the surface of the molten glass G, and stick to the ceiling of the vacuum degassing vessel 116. Consequently, a volatile matter present at the ceiling, which has been solidified in the form of crystals, may be included in the molten glass G. As a result, small opaque matters may remain in the glass product and form defects which are so-called “stones”. Further, even if the volatile matter is dissolved in the high temperature molten glass G, it will not be diffused uniformly in the molten glass G, and consequently, the molten glass G may have local changes in the composition. Due to the changes, the product glass obtained from the molten glass G, may have local changes in the refractive index and the see-through image of the glass may be distorted, which is so-called deterioration of leam.

Further, in order to increase the bottom area of the path in the vacuum degassing vessel 116, a method of increasing total length of the path of the vacuum degassing vessel 116 may be conceivable. However, there is a problem such that as the size of the apparatus increases, the apparatus becomes long as compared with the melting vessel 112. Consequently, it becomes necessary to change the relative position between the melting vessel 112 being the existing facility, and the downstream pit 124, whereby there will be a demerit that the existing facility can not effectively be utilized. Further, if the vacuum degassing vessel is made linearly long, the expansion of the vacuum degassing vessel 116 by a heat, increases in proportion thereto, and there will be a change in the center to center distance between the uprising pipe 118 and the downfalling pipe 120, which creates a distortion of the apparatus and thus may deteriorate the safety.

Otherwise, in order to increase the bottom area of the vacuum degassing vessel, a method of increasing the width of the path may also be conceivable. However, it is difficult to sufficiently improve the vacuum degassing performance only by increasing the width of the path. The reason will be described with reference to FIGS. 8 and 9. FIG. 8 is a schematic cross-sectional view of the vacuum degassing apparatus 110 taken along line B–B' in FIG. 3, and illustrates the cross-sectional shape of the path for molten glass in the vacuum degassing vessel 116. As illustrated in FIG. 8, the path for molten glass in the vacuum degassing vessel 116 in the vacuum housing 114, is formed by assembling path members 116*c*, and the bottom portion 116*d* of the path for molten glass is flat. FIG. 9 shows a flow rate distribution of molten glass in the transverse direction of the path. As shown in FIG. 9, it is evident that the flow rate of molten glass is highest at the center in the transverse direction (hereinafter referred to as the center of the path), and on the contrary, the flow rate of molten glass is lowest at the ends in the transverse direction (hereinafter referred to as the sides of the path). For this reason, there is a possibility that the molten glass flowing in the center of the path reaches the downfalling pipe without undergoing sufficient degassing, and bubbles are thereby included in the glass product. Namely, there has been a problem such that, even if the width of the path is simply increased, the molten glass still has a low flow rate and hardly flows at the sides of the path. Therefore, the increase of the width does not remarkably contribute to improvement of the vacuum degassing performance.

Under these circumstances, it is an object of the present invention to provide a vacuum degassing apparatus, whereby the costs can be minimized, the vacuum degassing performance can be improved, and it is possible to produce molten glass free from such problems as bubbles, stones or deterioration of leam.

The present invention provides a vacuum degassing apparatus for molten glass, comprising:

a vacuum housing which is evacuated to be depressurized therein;

a vacuum degassing vessel which is provided in the vacuum housing to vacuum-degas molten glass as the molten glass flows therein;

an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass;

wherein the cross sectional area of the path at the upper end portion of said uprising pipe is larger than the cross sectional area of the path at the lower end portion of said uprising pipe.

The present invention further provides the above-mentioned vacuum degassing apparatus, wherein the cross sectional area of the path at the upper end portion of said uprising pipe is from 1.1 to 9.0 times the cross sectional area of the path at the lower end portion of said uprising pipe, and the above-mentioned vacuum degassing apparatus, which is a vacuum degassing apparatus having an uprising pipe having a structure wherein a critical portion is provided at an intermediate position of the path in said uprising pipe, and the cross sectional area of the path at said upper end portion is larger than the cross sectional area of the path at said critical portion of said uprising pipe, and the distance from said upper end portion to said critical portion is from 0.05 to 0.5 times the distance from said upper end portion to said lower end portion.

The present invention still further provides a vacuum degassing apparatus for molten glass, comprising:

a vacuum housing which is evacuated to be depressurized therein;

a vacuum degassing vessel which is provided in the vacuum housing to vacuum-degas molten glass as the molten glass flows therein;

an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass;

wherein at at least a part of the path for molten glass in the flow direction in said vacuum degassing vessel, a bottom portion at the center in the transverse direction of the path, has a ridge shape and bottom portions at both ends in the transverse direction of the path, which are located on both sides of the center bottom portion, have valley shapes.

The present invention still further provides the above-mentioned vacuum degassing apparatus, wherein when the shortest distance from the top of the ridge shaped bottom portion at the center in the transverse direction of the path for molten glass in said vacuum degassing vessel, to the surface of the molten glass, is designated as the center depth $D_1$, and the shortest distance from the bottom of the valley shaped bottom portion at each of both ends in the transverse direction, to the surface of the molten glass, is designated as the side depth $D_2$, then the center depth $D_1$ is from 20 to 500 mm, and the side depth $D_2$ is from 1.1 to 5.0 times the center depth $D_1$, and the above-mentioned vacuum degassing apparatus, wherein a bubble blocking means is provided in the path for molten glass in said vacuum degassing vessel, to prevent bubbles formed by the vacuum-degassing from flowing out to the downfalling pipe side.

Now, the vacuum degassing apparatus for molten glass according to the present invention will be described in detail with reference to a preferred embodiment shown in the accompanying drawings.

Figure 1:
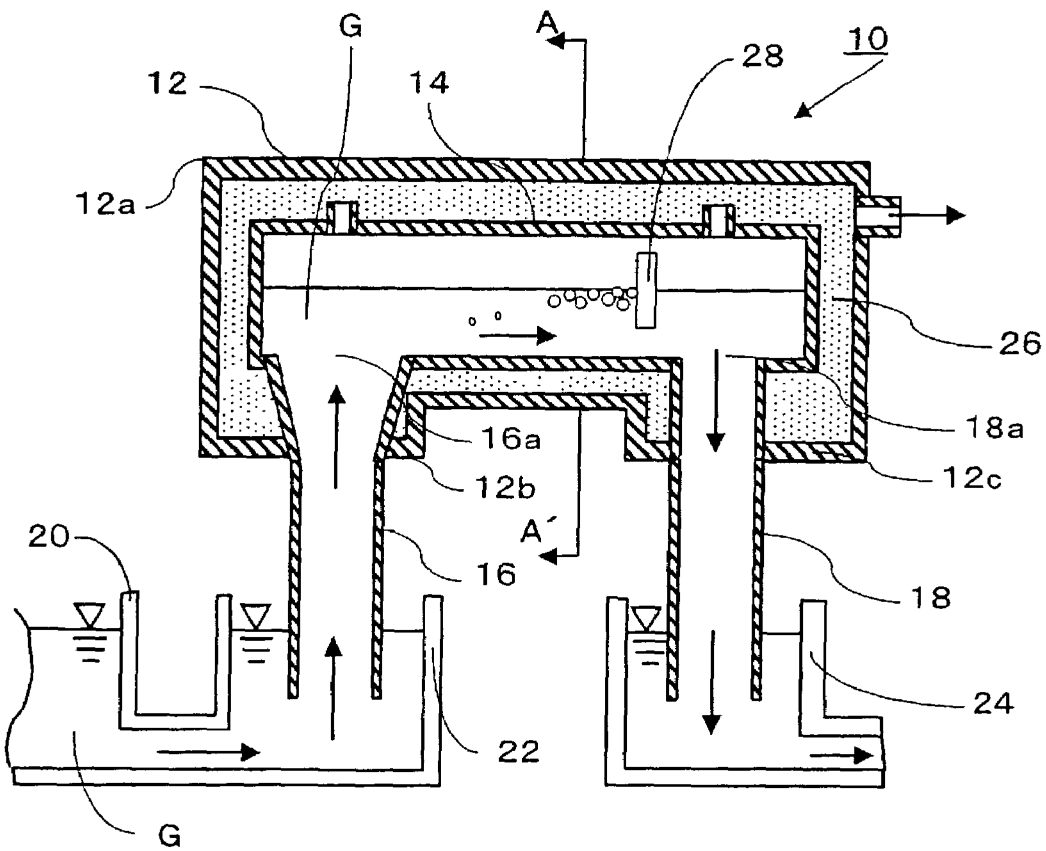
FIG. 1 is a schematic cross-sectional view illustrating an embodiment of the vacuum degassing apparatus of the present invention.

FIG. 1 shows a schematic cross-sectional view illustrating an embodiment of the vacuum degassing apparatus of the present invention. FIG. 1 shows, as compared with FIG. 3, that the cross-sectional area of the path at the upper portion of the uprising pipe is larger than the cross-sectional area of the path at the lower portion of the uprising pipe. As illustrated in FIG. 1, the vacuum degassing apparatus 10 is used in a process wherein molten glass G in a melting vessel 20 is vacuum-degassed and the degassed molten glass is continuously supplied to a subsequent treatment vessel, not shown, such as a forming treatment vessel for plate material like a floating bath, or a forming treatment vessel for bottles. The vacuum degassing apparatus 10 essentially comprises a vacuum housing 12, a vacuum degassing vessel 14, an uprising pipe 16 and a downfalling pipe 18.

The vacuum housing 12 is one for securing airtightness of the vacuum degassing vessel 14, and it is formed in a gate-like-shape and has a main body portion 12*a,* an uprising pipe accommodating portion 12*b,* and a downfalling pipe accommodating portion 12*c*. There is no particular limitation as to the material and the structure of the vacuum housing 12 as long as the vacuum housing has sufficient airtightness and strength required for the vacuum degassing vessel 14. However, the vacuum housing is preferably made of metal, in particular stainless steel. The vacuum housing 12 is evacuated from outside by e.g. a vacuum pump (not shown) and the inside is depressurized, so that the inside of the vacuum degassing vessel 14 provided therein is maintained under a prescribed pressure, for example, in a depressurized state of from 1/20 to 1/3 atm.

In the main unit portion 12*a* of the vacuum housing 12, a vacuum degassing vessel 14 is provided. An uprising pipe 16 is connected to the left end portion of the vacuum degassing vessel 14, and a downfalling pipe 18 is connected to the right end portion of the vacuum degassing vessel 14. Here, the uprising pipe 16 and downfalling pipe 18 are provided so that their main portions are respectively accommodated in the uprising pipe accommodating portion 12*b* and the downfalling pipe accommodating portion 12*c* in the vacuum housing 12, and the lower end portions of the uprising and downfalling pipes 16 and 18 extend out of the vacuum housing 12, respectively.

It is preferred to use a dense electro-cast refractory material for the vacuum degassing vessel 14, the uprising pipe 16 and the downfalling pipe 18 of the present invention. Namely, the essential part of the vacuum degassing apparatus 10, which is directly in contact with the molten glass, is formed by assembling electro-cast refractory bricks being dense electro-cast material, whereby the cost can be reduced to a large extent as compared with the essential part made of a noble metal such as platinum or a platinum alloy such as platinum-rhodium, which has been used heretofore. Further by this cost reduction, the vacuum degassing apparatus 10 can be designed to have a desired shape and a desired thickness. As a result, not only a large capacity of the vacuum degassing apparatus is realized, but also vacuum degassing treatment at a higher temperature becomes possible.

The electro-cast refractory bricks are not particularly restricted so long as they are molded into a prescribed shape by casting after the raw refractory material is melted by an electric melting process. Various types of conventional electro-cast refractory bricks may be used. Among them, alumina ($Al_2O_3$) type electro-cast refractory bricks, zirconia ($ZrO_2$) type electro-cast refractory bricks and alumina-zirconia-silica ($Al_2O_3$—$ZrO_2$—$SiO_2$) type electro-cast refractory bricks may be mentioned as preferred examples. Particularly, it is preferred to use MARSNITE (MB) when the temperature of molten glass G is at most 1,300° C., and to use ZB-X950 or ZIRCONITE (ZB) when it is more than 1,300° C. (all manufactured by Asahi Glass Company, Limited).

Although a dense electro-cast refractory material is used in this embodiment, the material is not limited thereto, and a dense burned refractory material may also be used.

Dense burned refractory bricks to be used as the dense burned refractory material, are preferably dense alumina type refractory bricks, dense zirconia-silica type refractory bricks or dense alumina-zirconia-silica type refractory bricks.

Further, there are boundaries between the molten glass G and the atmosphere at the lower end portion of the uprising pipe 16 where the pipe is immersed in the molten glass G in the upstream pit 22 downstream from the melting vessel 20, and at the lower end portion of the downfalling pipe 18 where the pipe is immersed in the molten glass G in the downstream pit 24. Accordingly, the vicinity of these boundaries is highly reactive, and particularly, deterioration of the electro-cast refractory bricks tend to advance at said boundary portions or at the joint portions between the bricks. Therefore, the lower end portion of the uprising pipe 16 and the lower end portion of the downfalling pipe 18 are preferably made of platinum or a platinum alloy.

Around the vacuum degassing vessel 14, a heat insulating material 26 is provided to cover the vacuum degassing vessel 14. Also around the uprising pipe 16 and the downfalling pipe 18, the heat insulating material 26 is provided to cover them respectively.

As the heat insulating material 16, various known standard shaped bricks or castable bricks may be used, and there is no particular restriction. The insulating material 26 thus provided, is covered by the vacuum housing 12 from outside, and is thereby accommodated in the vacuum housing 12.

Here, the temperature of the outer wall of the vacuum housing 12, is preferably made as low as possible, e.g. about 100° C., by insulating the heat conducted to the vacuum housing 12 as much as possible by the heat insulating material 26.

Now, the degassing mechanism of the vacuum degassing apparatus 10 and the path shape of the uprising pipe 16, which are the characteristics of the present invention, will be described.

A bubble included in the molten glass has a certain bubble size under the atmospheric pressure. When the pressure applied to the molten glass is lowered (depressurized), the bubble size increases inversely proportional to the pressure according to the Boyle-Charles' law. However, the present inventors have discovered that when the pressure is further depressurized beyond a certain pressure, the bubble size departs from the Boyle-Charles' law and rapidly increases. This phenomenon will be described with reference to FIG. 5.

Figure 5:
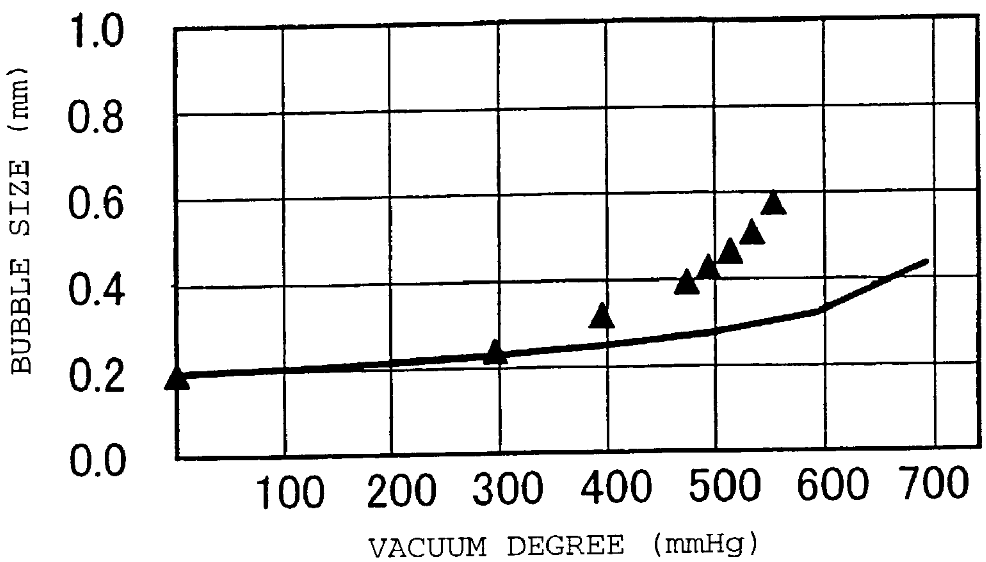
FIG. 5 is a view illustrating the change of the bubble size under reduced pressure.

FIG. 5 is a schematic view illustrating the change of the bubble size in molten glass by the decrease of the pressure applied to the molten glass, when molten glass having the composition as identified in Table 1 is used as the molten glass. The temperature of the molten glass is 1,320° C.

TABLE 1

| Chemical composition | Mass % |
|---|---|
| $SiO_2$ | 72.5 |
| $Al_2O_3$ | 2.0 |

TABLE 1-continued

| Chemical composition | Mass % |
|---|---|
| MgO | 4.0 |
| CaO | 8.0 |
| $Na_2O$ | 12.5 |
| $K_2O$ | 0.8 |
| $SO_3$ | 0.2 |

In FIG. 5, the ordinate axis represents the bubble size, and the abscissa axis represents the vacuum degree which is the difference between the pressure applied to the molten glass and the atmospheric pressure, and "vacuum degree is 0 (zero) (mmHg)" means that the pressure applied to the molten glass is the atmospheric pressure. Further, "vacuum degree is 700 (mmHg)" means that the pressure applied to the molten glass is depressurized from the atmospheric pressure by 700 (mmHg). The solid line in FIG. 5 indicates the relationship between the theoretical bubble size and the vacuum degree when they follow the Boyle-Charles' law. In FIG. 5, it is evident that by depressurizing a bubble having an initial bubble size of 0.2 (mm) under the atmospheric pressure, the bubble size gradually increases.

Whereas, the black triangular marks in FIG. 5 indicate the relationship between the actual bubble size of a bubble in the molten glass and the vacuum degree, and it is evident that a bubble having an initial bubble size of 0.2 (mm) departs from the Boyle-Charles' law after the vacuum degree exceeds 300 (mmHg) and becomes larger than the bubble size calculated by the Boyle-Charles' law. The vacuum degree where the bubble size departs from the Boyle-Charles' law is referred to as the critical pressure, and the critical pressure differs depending on the type of molten glass. Such a phenomenon that a bubble in the molten glass departs from the Boyle-Charles' law and becomes larger by increasing the vacuum degree, is considered to occur since some gas component it the molten glass diffuses into the bubble. Further, the bubble size increases, as the bubble is subjected for a longer time to a pressure below the critical pressure, and as the bubble size increases, the rising speed increases and the bubble becomes more likely to break on the surface of the molten glass.

When this principle is applied to the vacuum degassing vessel, it is evident that by making the cross sectional area of the path at the upper portion of the uprising pipe larger than the cross sectional area of the path at the lower portion of the uprising pipe, a bubble is subjected for a long time to a pressure below the critical pressure, and the improvement of degassing performance can be achieved. Here, the cross section of the path means a cross section of the path perpendicular to the direction in which the molten glass flows, the upper portion of the uprising pipe means a portion where the uprising pipe and the bottom surface of the vacuum degassing vessel are connected, and the lower portion of the uprising pipe means the lowest portion of the uprising pipe. Now, a vacuum degassing vessel to which this principle is applied, will be specifically described.

Figure 3:
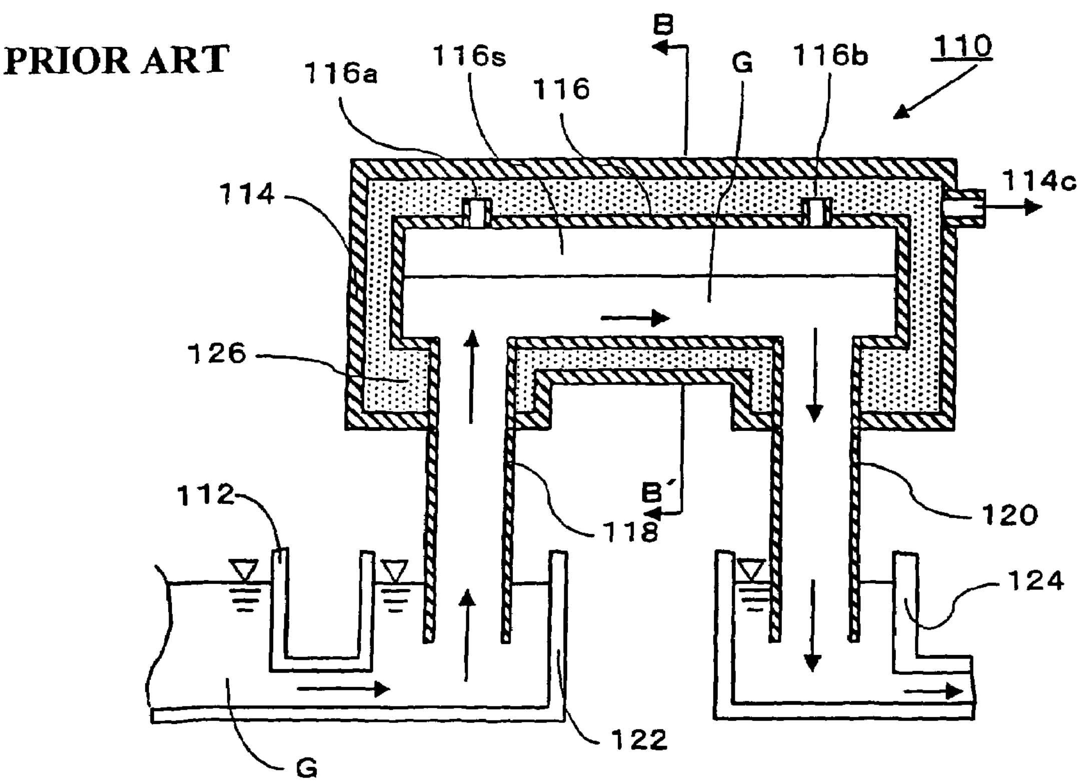
FIG. 3 is a schematic cross-sectional view illustrating an embodiment of a conventional vacuum degassing apparatus.
Figure 4:
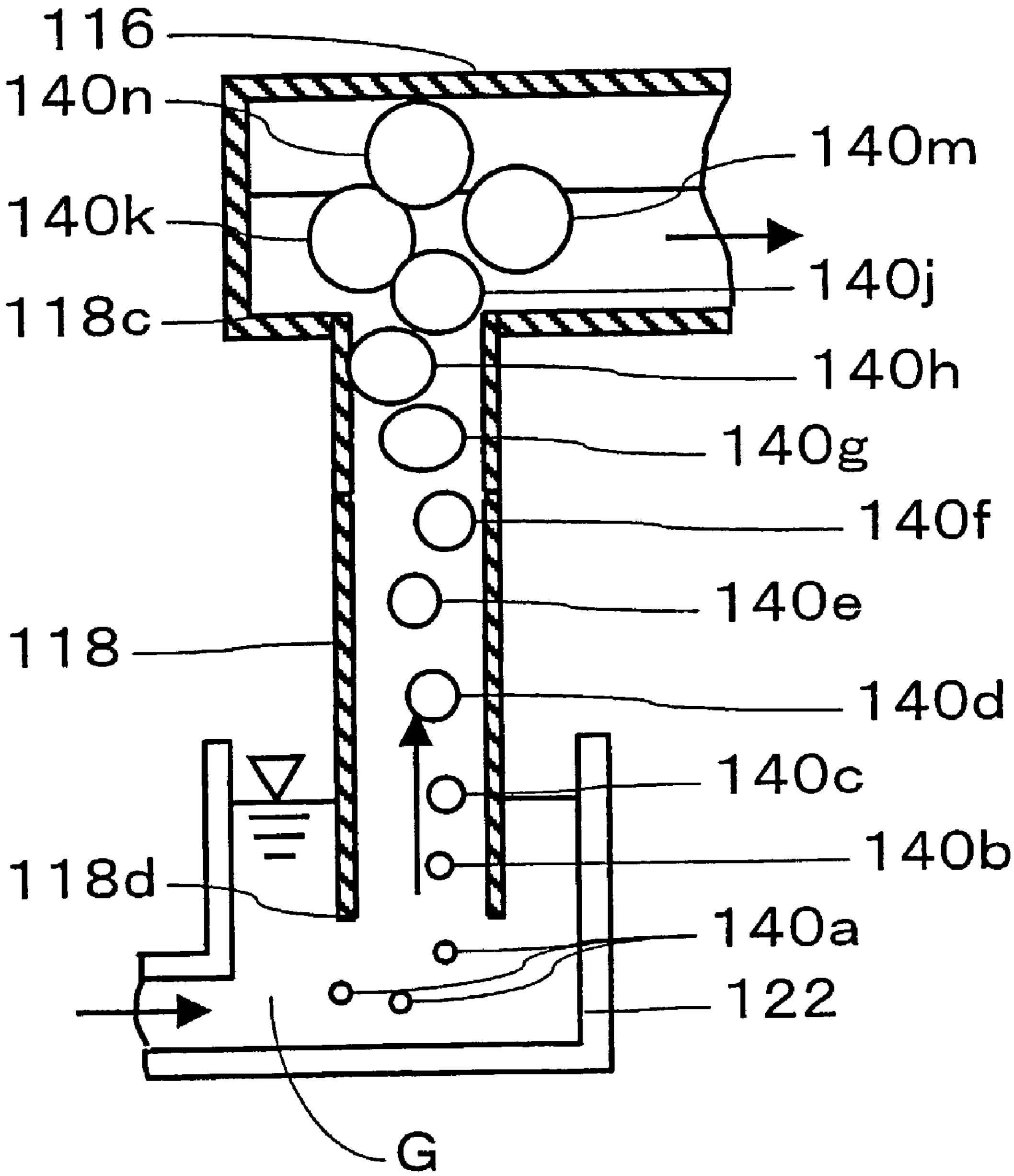
FIG. 4 is a cross-sectional view illustrating the degassing mechanism for removal of bubbles in the uprising pipe in FIG. 3.

FIG. 4 is a schematic view illustrating a conventional degassing mechanism for removal of bubbles in the uprising pipe 118 in FIG. 3, and it illustrates the state of the path where the molten glass G flows in the uprising pipe 118 of a conventional vacuum degassing apparatus 110 in FIG. 3.

In FIG. 4, the molten glass G flows together with bubbles 140*a* from the upstream pit 122 to the uprising pipe 118, and according to the principle of siphoning, rises in the path in the uprising pipe 118. Meanwhile, the bubbles 140*a* also rise in the path in the uprising pipe 118 along with the flow of the molten glass G. Since the pressure applied to the molten glass G lowers upwards from the lower end portion 16*d* of the uprising pipe 16, the bubble size increases from the bubbles 140*a* to bubbles 140*b* and then to bubbles 140*c* according to the Boyle-Charles' law. Further, as the molten glass G rises, the pressure applied to the bubbles further decreases, whereby the bubbles further expand departing from the Boyle-Charles' law.

However, as illustrated in FIG. 4, when the cross sectional area of the uprising pipe 118 is constant from its upper end portion 118*c* to the lower end portion 118*d*, there is no space in the path for bubbles to expand, and as shown by a bubble 140*g* and a bubble 140*h*, bubbles can not expand sufficiently. Accordingly, when the number of bubbles flowing into the vacuum degassing vessel 116 increases rapidly, the bubbles will not be completely removed and will remain in the molten glass, and unbroken bubbles will build up on the surface of the molten glass in the vacuum degassing vessel 116. In such a case, as shown by a bubble 140*n* in FIG. 4, bubbles may stick to the ceiling of the vacuum degassing vessel 116 and may produce "stones" or the deterioration of ream.

Further, it has become evident that when bubbles thus expanded are combined together to form a huge bubble, the huge bubble has a very large buoyancy, and rises at a high speed as compared with bubbles around it. This creates a problem that the flow rate per unit time of the molten glass G is not stable.

Figure 2:
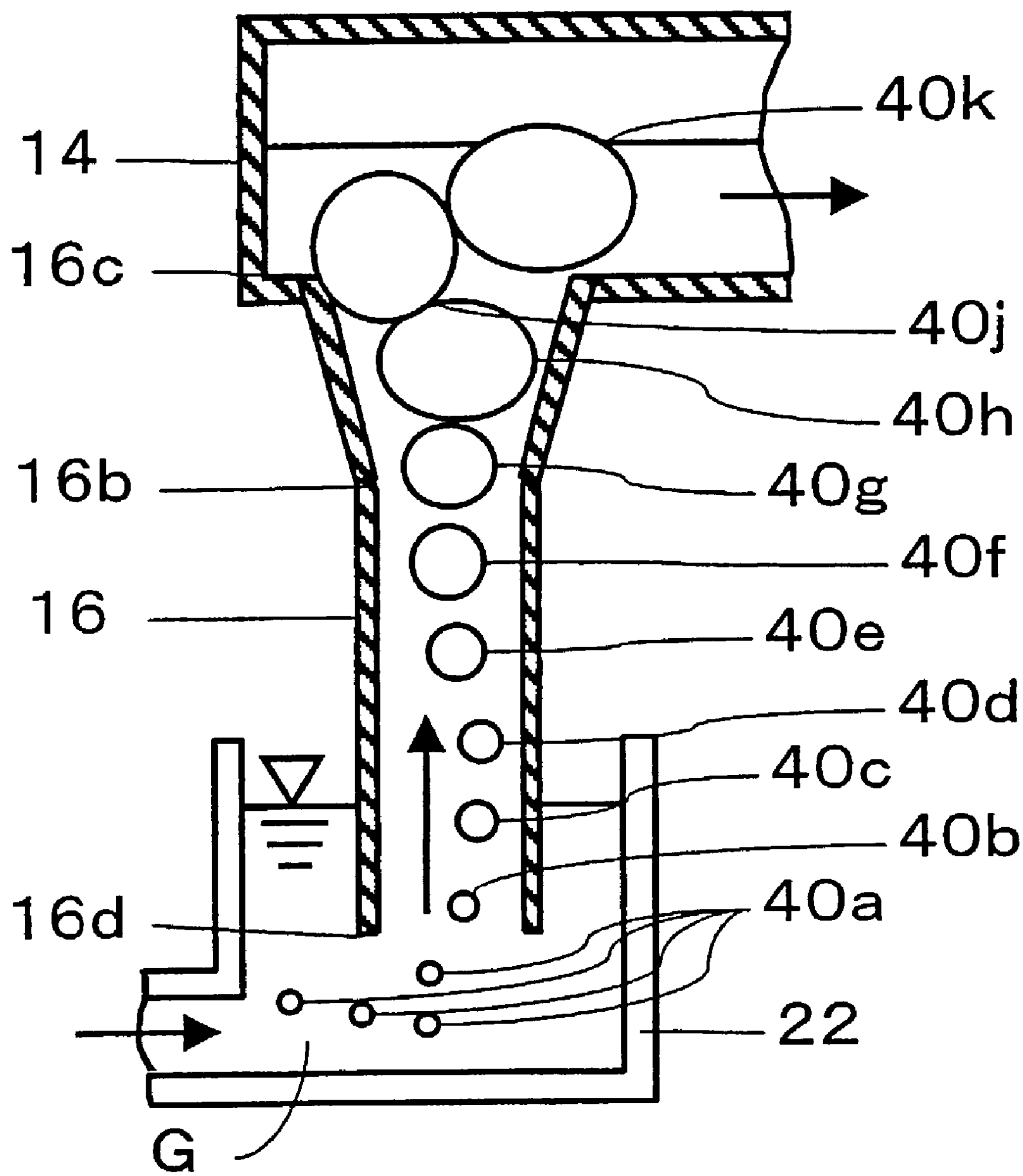
FIG. 2 is a schematic view illustrating the degassing mechanism for removal of bubbles in the uprising pipe in FIG. 1.

Whereas, FIG. 2 is a schematic view illustrating the degassing mechanism for removal of bubbles in the uprising pipe 16 in FIG. 1 according to the present invention, and it illustrates the state of the path where the molten glass G flows in the uprising pipe 16 of the vacuum degassing vessel 14 in FIG. 1. In FIG. 2, a critical portion 16*b* is provided at an intermediate position of the path in the uprising pipe 16, and the cross sectional area of the path is constant from the lower end position 16*d* of the uprising pipe 16 to the critical portion 16*b*. However, the structure is such that the cross sectional area of the path from the critical portion 16*b* to the upper end portion 16*c*, gradually increases from the critical portion 16*b* towards the upper end portion 16*c*. Here, the pressure applied to the molten glass G lowers upwards from the lower end portion 16*d* of the uprising pipe 16. Therefore, there is a point where the pressure applied to the molten glass G becomes the critical pressure at an intermediate position of the path, and the critical portion 16*b* is preferably locate at a lower position than such a point, since the vacuum degassing performance can thereby be improved.

As illustrated in FIG. 2, when the molten glass G flows in the path in the uprising pipe 16, the pressure applied to the molten glass G lowers as the molten glass G rises in the path in the uprising pipe 16. Therefore, bubbles 40*a* in the molten glass G expand to bubbles 40*b* and then to bubbles 40*c* according to the Boyle-Charles' law. Then, after the bubbles pass the critical portion 16*b*, the bubble size departs from the Boyle-Charles' law and rapidly increases. However, since there is a space where the bubbles can expand in the path in the uprising pipe 16 in FIG. 2, the bubbles can easily expand there and readily break on the surface of the molten glass G. Thus, the vacuum degassing performance can be improved, and bubbles become less likely to remain in the molten glass G. Further, bubbles become more readily breakable as they become larger, which brings about such an effect that the bubbles are less likely to stick to the ceiling of the vacuum degassing vessel 14, and thus, formation of defects such as "stones" or deterioration of learn can be suppressed.

Further, by employing the structure as shown in FIG. 2, the flow rate of the molten glass G flowing from the critical portion 16*b* to the upper end portion 16*c* can be decreased. It is thereby possible to subject bubbles for long time to a pressure below the critical pressure, and thereby to improve the vacuum degassing performance. Further, since there is a large space for the molten glass G to flow, the expanded bubbles are less likely to combine together to form a huge bubble, and the flow rate per unit time of the molten glass G can be stabilized.

The cross sectional shape of the path in the uprising pipe 16 may not necessarily be a circular shape, and may be an elliptical shape or a rectangular shape. Further, the cross sectional area of the path in the uprising pipe 16 may be increased from the lower end portion 16*d* gradually or stepwisely.

Further, the distance from the upper end portion 16*c* of the uprising pipe 16 to its lower end portion 16*d* is preferably from 2 to 5 m, and the distance from the upper end portion 16*c* to the critical portion 16*b* is preferably from 0.05 to 0.5 times the distance from the upper end portion 16*c* to the lower end portion 16*d*, since the vacuum degassing performance can thereby be improved.

The cross sectional area of the path at the upper end portion 16*c*, may vary also depending on the width of the path in the vacuum degassing vessel 14. However, in order to improve the vacuum degassing performance, it is preferably from 1.1 to 9.0 times, particularly preferably from 1.5 to 4.0 times, the cross sectional area of the path at the lower end portion 16*d*. Further, the flow rate of the molten glass per unit time in the vacuum degassing vessel of the present invention, may vary depending on the size of the vacuum degassing vessel, but it is from 1.5 to 350 ton/day.

Further, the cross sectional shape of the vacuum degassing vessel 14, which is a characteristic of the present invention, will be described as follows.

Figure 6:
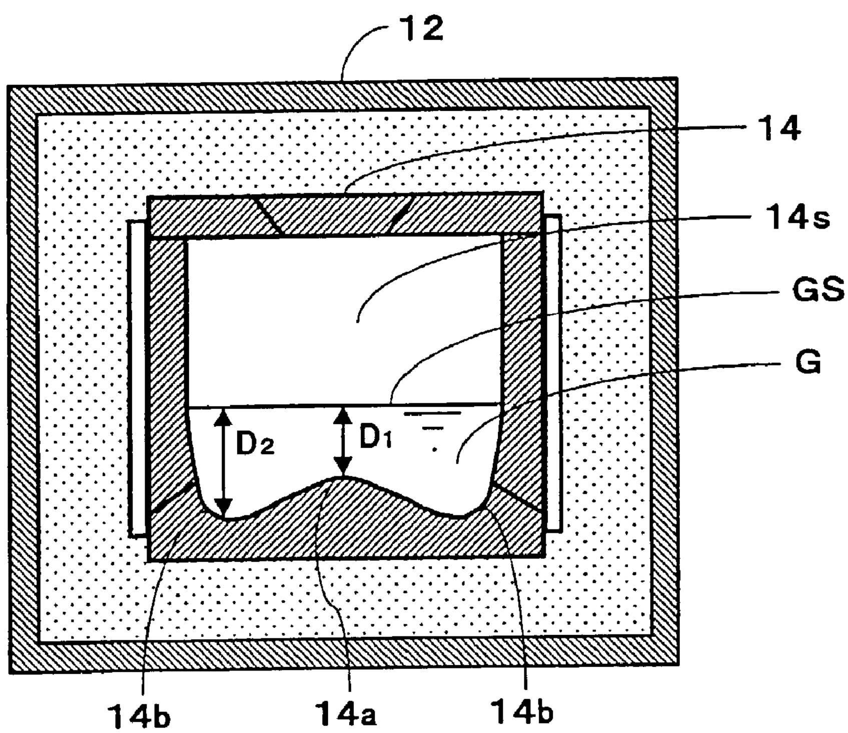
FIG. 6 is a schematic cross-sectional view of the vacuum degassing apparatus taken along line A–A' in FIG. 1.

FIG. 6 is a schematic cross-sectional view of the vacuum degassing apparatus 10 taken along line A–A' in FIG. 1. As illustrated in FIG. 6, it is characterized that at at least a part of the path of molten glass in the flow direction in the vacuum degassing vessel 10 of the present invention, a bottom portion 14*a* at the center in the transverse direction of the path, has a ridge shape and the bottom portions 14*b* at both ends in the transverse direction of the path, which are located on both size of the center bottom portion 14*a*, have valley shapes. (Hereinafter, this shape will be referred to as a ridge-valley shape.)

Figure 8:
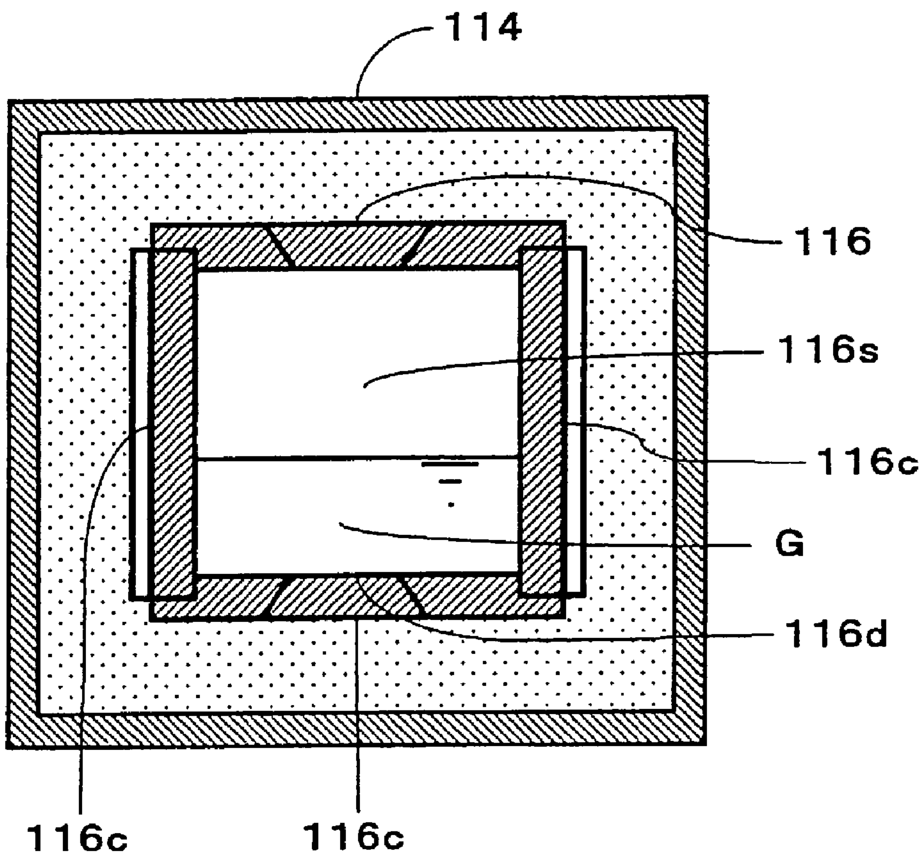
FIG. 8 is a schematic cross-sectional view of the vacuum degassing apparatus taken along a line B–B' in FIG. 3.

By making the bottom portion of the path in the vacuum degassing vessel 14 have a ridge-valley shape as illustrated in FIG. 6, it is possible to let more glass flow at the areas (namely at both sides of the path) where longer time can be taken for vacuum degassing, as compared with a case where, as shown in FIG. 8, the bottom portion 116*d* of the path is flat. Such an effect is thereby obtained that both sides of the path which have not been very useful for vacuum degassing (namely, the sides of the path which have had an extra room in the vacuum degassing capacity, because through there, the time for the molten glass G to flow from an inflow port 16*a* to an outflow port 18*a* becomes longest), can now effectively be used for vacuum degassing, and the vacuum degassing performance is thereby be improved. These results are also confirmed by a simulation test of the vacuum degassing at the same time. As described above, by making the bottom portion of the path of the molten glass in the vacuum degassing vessel 14 have the above-mentioned ridge-valley shape, the vacuum degassing performance can be improved, vacuum degassing treatment of molten glass in a larger flow amount becomes possible, and molten glass free from residual bubbles can be obtained.

Figure 7:
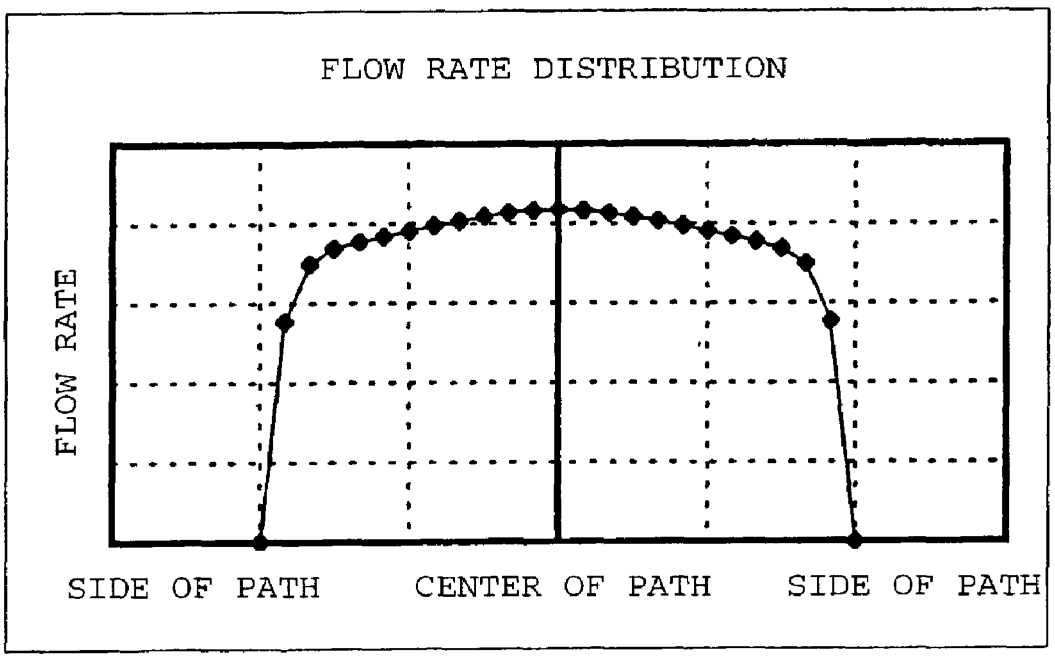
FIG. 7 is a view illustrating the distribution in the transverse direction of the flow rate of molten glass flowing in the path of the vacuum degassing vessel in FIG. 1.
Figure 9:
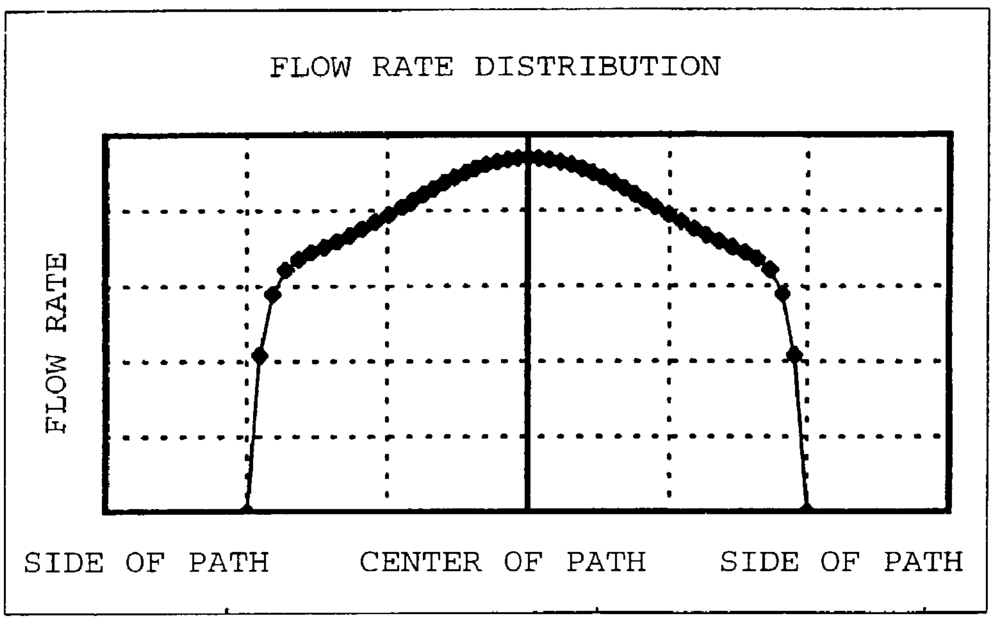
FIG. 9 is a view illustrating the distribution in the transverse direction of the flow rate of molten glass flowing in the path of the vacuum degassing vessel in FIG. 3.

Further, FIG. 7 shows a diagram illustrating the distribution in the transverse direction of the flow rate of molten glass flowing in the path having the ridge-valley shaped bottom portion in FIG. 6. As shown in FIG. 7, the flow rate of molten glass at the center of the path is evidently lower than in the case of FIG. 9 where the bottom portion 116*d* of the path is flat. For this reason, molten glass flowing at the center of the path is less likely to reach the downfalling pipe before being sufficiently degassed, whereby the vacuum degassing performance is improved, and vacuum degassing treatment of molten glass in a larger flow amount becomes possible.

Further, in the path for molten glass in the vacuum degassing vessel 14 as illustrated in FIG. 6, rising of bubbles is active not only at the center of the path but also at both sides of the path. Further, the molten glass G present at the center bottom portion 14*a* flows into the side bottom portions 14*b*, and consequently the flow rate of the molten glass G at both sides of the path increases as illustrated in FIG. 7. Thus, it is possible to obtain a flow of the molten glass G having a constant flow rate in the transverse direction of the path without stagnation. Namely, there is no portion where the flow rate of the molten glass G is locally low, and the molten glass G is discharged smoothly from the downfalling pipe 18. Therefore, a glass product such as a glass sheet being a final product, will have a uniform composition, and will be free from deterioration of leam (a problem that the see-through image is badly distorted due to a local change in the refractive index) caused by non-uniformity of the composition. Thus, an improvement of the quality of a glass product such as a glass sheet can be achieved.

The bottom portion of the path for molten glass in the vacuum degassing vessel 14, may not necessarily have the ridge-valley shape as shown in FIG. 6 over its entire length, namely over the entire length in the flow direction of molten glass, so long as a part of it has the ridge-valley shape. Further, it is preferred that the bottom portion of the path in the area from the flow-in port 16*a* from the uprising pipe to the flow-out port 18*a* to the downfalling pipe, is made to have the ridge-valley shape. Further, the width of the ridge shaped portion at the center of the bottom portion of the path, or the width of the valley shaped portions located on its both sides, are adjusted so that the effective degassing can be performed. Namely, the width of the ridge shaped portion or the width of the valley shaped portions may not necessarily be constant in the flow direction of molten glass, and may gradually increase or gradually decrease. The path for molten glass having the ridge-valley shape, preferably has a smooth structure at the portion where the molten glass is in contact, in order to prevent occurrence of deterioration of the leam.

Further, by making the bottom portion of the path in the vacuum degassing vessel 14 have the ridge-valley shape as illustrated in FIG. 6, it is possible to decrease the center depth $D_1$ being the shortest distance from the top of the ridge shaped bottom portion at the center in the transverse direction, to the surface of the molten glass, and it is possible to increase the side depth $D_2$ being the shortest distance from the bottom of the valley shaped bottom portion at each of both ends in the transverse direction, to the surface GS of the molten glass. By such a structure, the vacuum degree at the center bottom portion of the path, can be increased when the vacuum degree at the surface of the molten glass is constant, whereby bubbles tend to readily rise, and the vacuum degassing performance can further be improved. When the bottom portion of the path has a flat shape as shown in FIG. 8, if the depth of the molten glass is entirely reduced, the flow rate of the molten glass increases at the same time. Consequently, the time for molten glass to flow from the flow-in port 16*a* to the flow-out port 18*a* becomes shorter, thus bringing about a demerit that the degassing becomes difficult, at the same time, and it is thereby difficult to improve the vacuum degassing performance.

Further, it is preferred that the center depth $D_1$ of the path of molten glass in the vacuum degassing vessel 14 is from 20 to 500 mm, and the side depth $D_2$ is from 1.1 to 5.0 times the center depth $D_1$, whereby the vacuum degassing performance can further be improved, and the deterioration of leam can effectively be prevented. Further, as shown in FIG. 6, the side depths $D_2$ exist at both sides in the path of the molten glass, but these may not necessarily have the same value, and may be different from each other.

Further, as illustrated in FIG. 6, it is preferred that a bubble blocking means 28 is provided in the downstream portion in the vacuum degassing vessel 14, to prevent bubbles formed by the vacuum-degassing from flowing out to the out flow port 18*a* connected to the downfalling pipe. This is to prevent bubbles which are not broken on the surface GS of the molten glass while molten glass G flows in the upstream portion of the vacuum degassing vessel 14, from passing, as they float, through the out flow port 18*a* and being discharged from the downfalling pipe 18.

An embodiment of the present invention has been described in detail above. However, the present invention is by no means restricted to the above-mentioned embodiment, and it is a matter of course that various improvements and modifications may be performed without departing from the gist of the present invention.

As described above, according to the present invention, by making the cross sectional area of the path at the upper end portion of the uprising pipe, larger than the cross sectional area of the path at the lower end portion of the uprising pipe, it is possible to have a space in the path where bubbles can expand. Thus, bubbles can easily expand, and the vacuum degassing performance can be improved. Further, as the bubbles expand, they become more likely to break, whereby such an effect is obtained that bubbles are less likely to stick to the ceiling of the vacuum degassing vessel, and it is thereby possible to obtain molten glass which is not likely to produce defects such as bubbles, "stones" and the deterioration of leam. Further, since there is a space in the path where bubbles can expand, it is less likely to expanded bubbles will combine together to form a huge bubble, and thereby, the flow rate per unit time of the molten glass G, can be stabilized.

Further, according to the present invention, the cross sectional shape of the path for molten glass in the vacuum degassing vessel, is characterized that at at least a part of the path in the flow direction, a bottom portion at the center in the transverse direction of the path, has a ridge shape and bottom portions at both ends in the transverse direction located on both sides of the center bottom portion, have valley shapes. Accordingly, it is possible to let more glass flow at the areas (namely the side of the path) where longer time can be taken for vacuum degassing, and to increase the vacuum degree at the center bottom portion of the path. Further, it is possible to decrease the flow rate of molten glass at the center of the path, whereby such an effect can be obtained that the vacuum degassing performance is improved. As a result, the vacuum degassing treatment of molten glass in a large flow amount becomes possible, and it is thereby possible to obtain molten glass free from residual bubbles.

Further, both sides of the path which have not been very useful for vacuum degassing, can now be effectively used for vacuum degassing, whereby the vacuum degassing performance can be improved, and further, the deterioration of leam can be prevented.

The entire disclosures of Japanese Patent Application No. 2001-299213 filed on Sep. 28, 2001 and Japanese Patent Application No. 2001-334106 filed on Oct. 31, 2001 including specifications, claims, drawings and summaries are incorporated herein by reference in their entireties.

What is claimed is:

1. A vacuum degassing apparatus for molten glass, comprising:

a vacuum housing which is evacuated to be depressurized therein;

a vacuum degassing vessel which is provided in the vacuum housing to vacuum-degas molten glass as the molten glass flows therein;

an uprising pipe which connects to the vacuum degassing vessel, and sucks and draws up undegassed molten glass to introduce the undegassed molten glass into the vacuum degassing vessel;

and a downfalling pipe which connects to the vacuum degassing vessel and draws down degassed molten glass from the vacuum degassing vessel to discharge the degassed molten glass;

wherein at at least a part of the path for molten glass in the flow direction in said vacuum degassing vessel, a bottom portion at the center in the transverse direction of the path, has a ridge shape and bottom portions at both ends in the transverse direction of the path, which are located on both sides of the center bottom portion, have valley shapes.

2. The vacuum degassing apparatus according to claim 1, wherein when the shortest distance from the top of the ridge shaped bottom portion at the center in the transverse direction of the path for molten glass in said vacuum degassing vessel, to the surface of the molten glass, is designated as the center depth $D_1$, and the shortest distance from the bottom of the valley shaped bottom portion at each of both ends in the transverse direction, to the surface of the molten glass, is designated as the side depth $D_2$, then the center depth $D_1$ is from 20 to 500 mm, and the side depth $D_2$ is from 1.1 to 5.0 times the center depth $D_1$.

3. The vacuum degassing apparatus according to claim 1, wherein a bubble blocking means is provided in the path for molten glass in said vacuum degassing vessel, to prevent bubbles formed by the vacuum-degassing from flowing out to the downfalling pipe side.

* * * * *